United States Patent

[11] 3,620,250

| [72] | Inventor | Gregory J. Wieck<br>Enterprise, Oreg. |
|---|---|---|
| [21] | Appl. No. | 855,276 |
| [22] | Filed | Sept. 4, 1969 |
| [45] | Patented | Nov. 16, 1971 |
| [73] | Assignee | Battelle Development Corporation<br>Columbus, Ohio |

[54] IRRIGATION APPARATUS
5 Claims, 4 Drawing Figs.

[52] U.S. Cl. ............................................. 137/561,
    137/580, 251/145
[51] Int. Cl. .......................................... A01g 25/02
[50] Field of Search ................................. 137/561,
    580, 225, 321, 322; 251/145, 320, 339, 149.5,
    149.6, 149.7; 285/302

[56] References Cited
UNITED STATES PATENTS

| 1,580,325 | 4/1926 | Perry | 285/302 |
|---|---|---|---|
| 1,707,312 | 4/1929 | McDaniel | 285/302 X |
| 3,012,574 | 12/1961 | Baker et al. | 137/525 X |
| 3,085,549 | 4/1963 | Kacsuta | 137/525 X |
| 3,349,794 | 10/1967 | Behlen | 137/580 X |
| 3,447,751 | 6/1969 | Wieck | 137/512.15 X |
| 3,473,564 | 10/1969 | Bates | 137/580 |
| 3,498,321 | 3/1970 | Barrett et al. | 137/525 |

Primary Examiner—M. Cary Nelson
Assistant Examiner—Richard Rothman
Attorney—Buckhorn, Blore, Klarquist and Sparkman ABSTRACT: A movable irrigation line is supplied with water from an extraction tube movable with the line along a supply line having spaced outlet valves which are sequentially opened when in the extraction tube. The extraction tube has therein an endless belt carrying valve actuators which keep at least one of the valves in the tube opened.

PATENTED NOV 16 1971

GREGORY J. WIECK
INVENTOR

BY BUCKHORN, BLORE, KLARQUIST & SPARKMAN
ATTORNEYS

GREGORY J. WIECK
INVENTOR

BY
BUCKHORN, BLORE, KLARQUIST & SPARKMAN
ATTORNEYS 3,620,250

IRRIGATION APPARATUS

DESCRIPTION

This invention relates to an improved irrigation apparatus, and more particularly to an improved water supplying device for an irrigation line move.

An object of the invention is to provide an improved irrigation apparatus.

Another object of the invention is to provide an improved water supplying device for an irrigation line move.

A further object of the invention is to provide an irrigation apparatus having an extraction tube movable with an irrigation line along a water supply pipe and adapted to open outlet valves in the pipe when the valves are in the extraction tube.

The invention provides an improved irrigation apparatus in which an irrigation line move is supplied with water by an extraction tube structure movable with the line move along a water supply pipe. The extraction tube structure sequentially encloses normally closed valves in the water supply pipe and opens the valves when the latter are enclosed within an extraction tube of the extraction tube structure. In an apparatus forming a specific embodiment of the invention, an extraction tube is connected by a slip joint to an irrigation line which is moved in a direction parallel to an elongated water supply pipe which is concentric to the extraction tube. The extraction tube carries an endless belt having cam actuators which press open check valves in the water supply pipe and serve to spline the water supply pipe to the extraction tube.

Figure 1:
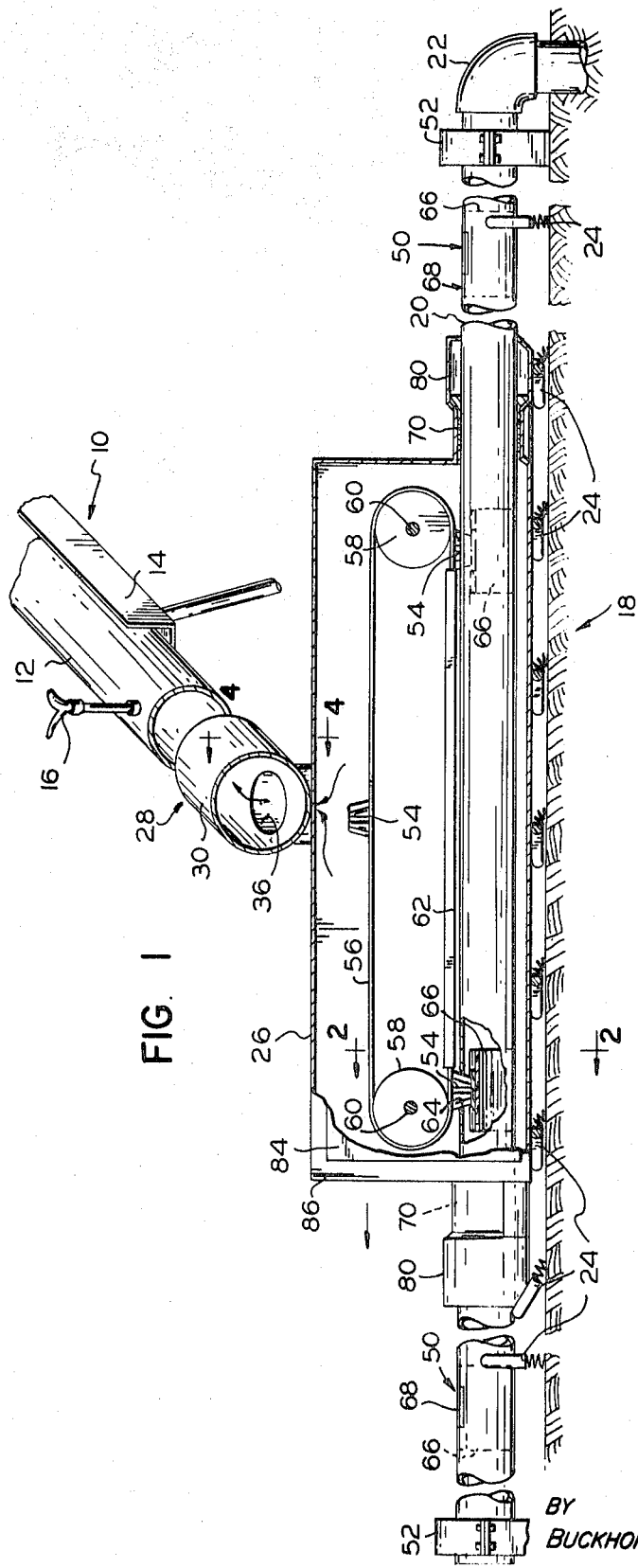
FIG. 1 is a fragmentary perspective view of an improved irrigation apparatus forming one embodiment of the invention.

Referring now in detail to the drawings, there is shown therein an improved irrigation apparatus forming one embodiment of the invention and including an irrigation line move 10 including a main or central pipe 12 carried by tractors or carriages 14 and having sprinklers 16. A water supply structure 18 supplies water to the pipe 12 as the latter is moved over the field in a direction transverse to the longitudinal axis of the pipe 12. The structure 18 includes a water supply pipe 20 fixed against endwise movement and supplied with water under pressure from a conduit 22 leading to a source of water under pressure such as, for example, a pump. The pipe is supported in a position elevated from the ground at spaced points by resilient supports 24, which are normally vertical but which are pivotal by an extraction tube 26 of the water supply structure when the tube 26 is moved to and past the supports 24.

Figure 4:
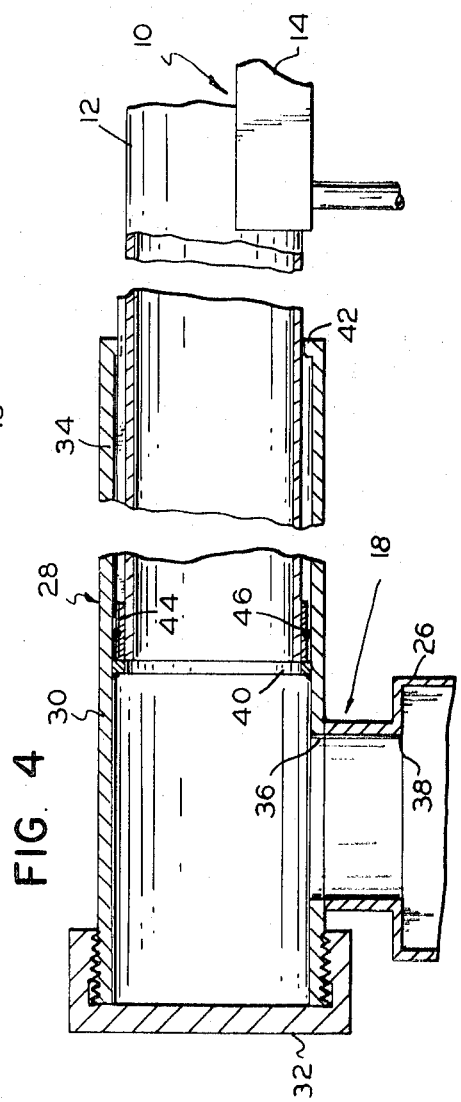
FIG. 4 is a fragmentary, enlarged vertical section taken along line 4–4 of FIG. 1.
Figure 2:
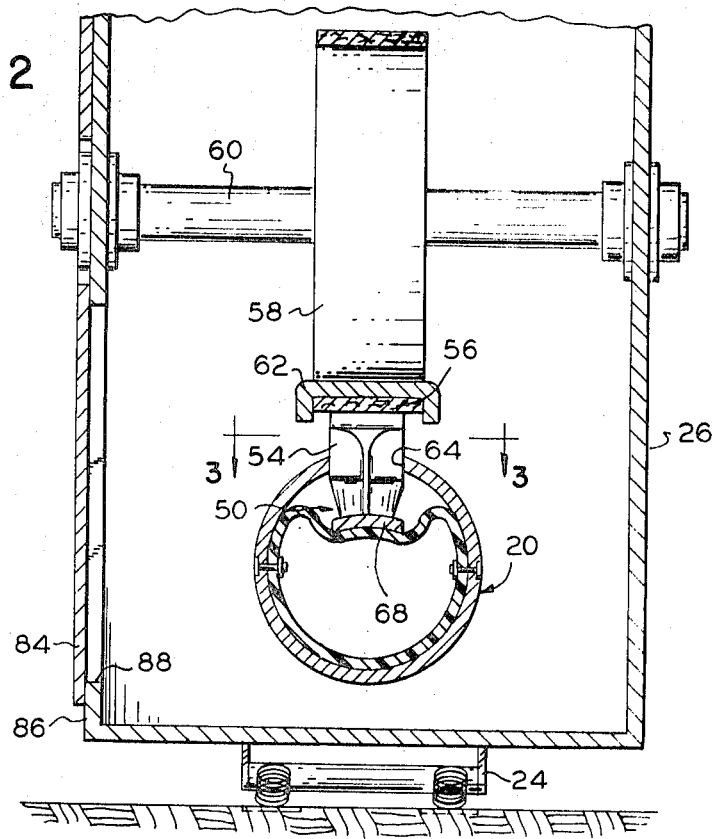
FIG. 2 is a fragmentary, enlarged vertical section taken along line 2—2 of FIG. 1.
Figure 3:
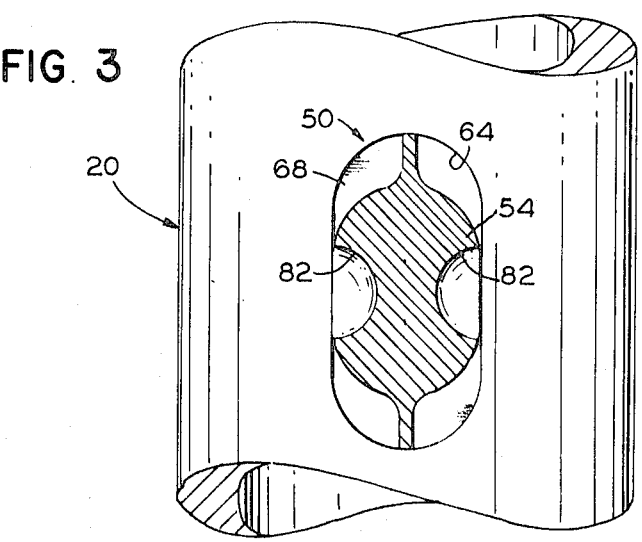
FIG. 3 is a fragmentary, enlarged horizontal section taken along line 3—3 of FIG. 2.

The pipe 12 carries the tube 26 and is connected thereto by a slip joint structure 28 (FIG. 4) including a pipe 30 closed at one end by a cap 32 and into which one end portion of the pipe 12 slidably extends and to which the pipe 12 is splined by spline 34. The pipe 30 is welded to the tube 26 with openings 36 and 38 therein aligned with each other. Stops 40 and 42 limit the travel of the pipe 12 relative to the pipe 30 and a long bearing or guide 44 carrying an O-ring seal 46 is slidable along the pipe 30. The pipe 30 moves the extraction tube 26 therewith along the pipe 20 and is supplied with water under pressure from the tube 26. This slip joint structure removes any end thrust from the line to the pipe 30.

The pipe 20 has check valves 50 spaced equidistantly therealong and all facing directly upwardly, clamps 52 holding the pipe 20 against turning. Tapered actuators 54 are carried by an endless belt 56 mounted on free running pulleys 58 rotatably mounted in the tube 26 on axles 60 supported on the interior sides of the tube 26. The lower course of the belt travels in a downwardly facing, channellike backing plate or guide 62 mounted fixedly in the tube 26 and forming a rigid backing and guide for the lower course of the belt. The actuators are spaced along the belt the same distance as the spacing between the valves 50 along the pipe, and backing plate 62 forces each actuator into one of openings 64 to press the adjacent portion of a resilient valving tube 66 downwardly from the opening 64 to open the valve. Actually, the actuator engages a rigid filler plug 68 fixed to the tube 66 and presses the plugs 68 down out of the opening, and this presses the tube 66 away from the opening to open the valve to permit water to flow from the pipe 20 into the extraction tube 26. Engagement of the end portion of each hole 64 with the actuator therein holds the actuator from movement with the tube 26 and causes the belt to travel around the pulleys as the tube 26 is moved along the pipe 20. The portion of the tube 26 between slidable seals 70 at the ends of the tube 26 and the distance between the pulleys is sufficiently long that there will always be one of the valves 50 fully opened and often two. This means that, as each valve is opened, there is very little difference in pressure between the water in the pipe 20 and the water in the tube 26. Hence, the valves are easily opened. Also, the irrigation line is continuously supplied with water under pressure. Washing sections 80 are positioned at the ends of the tube 26 to wash any debris from the tube 20 before that portion of the tube enters the seals 70. The seals prevent loss of water and pressure from the tube 26. The plugs 68 fill the openings 64 and are flush with the exterior of the pipe 20 when in normal positions, as they are when the valves pass through the cylindrical seals 70. Except when the valves 50 are in the tube 26, the high pressure of the water in the pipe 20 presses the sleeve 66 tightly against the interior of the pipe 20 to seal off the openings 64.

While the water supply structure 18 has been shown as mounted on one end of and carried by the pipe of the line move, the structure obviously may be mounted on the central portion of the pipe 12, or may be connected by a flexible hose to the pipe 12 and be moved along the pipe 20 by a cable or by a line towing tractor.

The actuators 54 (FIG. 1) are tapered to facilitate easy entry of the actuators into the openings 64, and also to key or spline the tube 26 to the pipe 20. The actuators also include openings 82 to increase the orifice areas. A door 84 is releasably sealed to a side 86 of the tube 26 to cover an access opening 88.

What is claimed is:

1. In an improved irrigation apparatus,
    water supply pipe means having a plurality of outlet valves spaced therealong,
    chamber means adapted to span a plurality of the valves to sequentially open the valves to extract water therefrom,
    actuator means adapted to hold open valves spanned by the chamber means,
    sealing means at the ends of the chamber means,
    the actuator means comprising a plurality of actuators, an endless belt and guide means in the chamber means mounting the belt for travel thereover and for holding the actuators in valve-opening positions,
    and a line move movable along the pipe with the chamber means and supplied with water by the chamber means,
    the chamber means being moved by the line move,
    the guide means including a channellike guide holding the belt against lateral movement,
    the actuator means including splining means secured to the belt and adapted to spline the belt to the pipe means.

2. The improved irrigation apparatus of claim 1 wherein the actuator means includes a plurality of actuators adapted to enter openings of the valves and spline the belt to the pipe means.

3. In an improved irrigation apparatus,
    water supply pipe means having a plurality of outlet valves spaced therealong,
    and extraction means movable along the pipe means in sealed engagement therewith and adapted to sequentially open the valves to extract water therefrom, the extraction means including a plurality of actuators adapted to enter openings of the valves and spline the extraction means to the supply pipe means.

4. The improved irrigation apparatus of claim 3 wherein the actuators are fluted and substantially fill the openings.

5. In an improved irrigation apparatus, water supply pipe means having a plurality of outlet valves spaced therealong, extraction means movable along the pipe means in sealed engagement therewith and adapted to sequentially open the valves to extract water therefrom, a plurality of supporting legs for supporting the pipe means, and means mounting the legs for movement between positions permitting passage of the extraction means therepast.

* * * * *